(12) United States Patent
Beck et al.

(10) Patent No.: US 9,452,476 B2
(45) Date of Patent: Sep. 27, 2016

(54) FIXING APPARATUS

(75) Inventors: Matthias Beck, Metzingen (DE);
Günther Schips, Pfullingen (DE)

(73) Assignee: SAUTER FEINMECHANIK GMBH,
Metzingen (DE)

( * ) Notice: Subject to any disclaimer, the term of this patent is extended or adjusted under 35 U.S.C. 154(b) by 425 days.

(21) Appl. No.: 13/261,611

(22) PCT Filed: Sep. 8, 2011

(86) PCT No.: PCT/EP2011/004520
§ 371 (c)(1),
(2), (4) Date: Mar. 4, 2013

(87) PCT Pub. No.: WO2012/031758
PCT Pub. Date: Mar. 15, 2012

(65) Prior Publication Data
US 2013/0157825 A1    Jun. 20, 2013

(30) Foreign Application Priority Data

Sep. 10, 2010    (DE) .......................... 10 2010 044 968

(51) Int. Cl.
*B23B 29/24*    (2006.01)
*B23B 3/16*    (2006.01)
*B23B 29/20*    (2006.01)

(52) U.S. Cl.
CPC ............. *B23B 29/20* (2013.01); *B23B 29/242* (2013.01); *Y10T 29/5154* (2015.01); *Y10T 82/2587* (2015.01)

(58) Field of Classification Search
CPC ..... B23B 29/20; B23B 29/242; B23B 29/24; B23B 31/02; B23Q 39/02; Y10T 29/5154; Y10T 82/2587

USPC ........ 82/121, 131, 159, 158, 150; 29/39, 40, 29/35.5
See application file for complete search history.

(56) References Cited

U.S. PATENT DOCUMENTS

| 922,429 A * | 5/1909 | Hollm ..................... B23B 29/20 29/35.5 |
| 2,366,370 A * | 1/1945 | Terwilliger ............. B23B 29/04 82/158 |

(Continued)

FOREIGN PATENT DOCUMENTS

DE        39 29 802 C1    11/1990
DE    10 2005 045 662 A1    3/2007

(Continued)

*Primary Examiner* — Sara Addisu
(74) *Attorney, Agent, or Firm* — Wenderoth, Lind & Ponack, L.L.P.

(57) ABSTRACT

A fixing apparatus releasably fixes functional elements, particularly a tool holder (1) on a tool disk (3), about one fixing axis (5). These two functional components each have a bearing surface (7, 9) for bearing mutually against one another, and at least one fixing element (11, 13). The fixing element (13) has two fixing bodies (19) connected in a positionally unchangeable manner to the associated functional component on both sides of the fixing axis (5) and at a spacing from one another. Each fixing body (19) forms a fixing surface (25) extending transversely with respect to the fixing axis (5). The fixing surfaces (25) can both be placed from the same side against an associated positioning surface (17) and are situated as fixing elements (11) on the other functional component at a spacing from one another.

7 Claims, 3 Drawing Sheets

(56) References Cited

U.S. PATENT DOCUMENTS

| | | | | |
|---|---|---|---|---|
| 2,634,646 A | * | 4/1953 | Clatfelter | B23B 29/043 407/83 |
| 2,697,611 A | * | 12/1954 | Glasser | 279/6 |
| 2,711,664 A | * | 6/1955 | Misuraca | B23B 29/04 82/161 |
| 3,680,416 A | * | 8/1972 | Van Dijk | B23B 29/04 82/158 |
| 4,327,612 A | * | 5/1982 | Bazuin | B23B 3/161 82/120 |
| 5,875,696 A | * | 3/1999 | Grossmann | B23B 29/20 29/40 |
| 6,003,415 A | * | 12/1999 | Turner et al. | 82/159 |
| 8,578,622 B2 | * | 11/2013 | Sahm | 33/645 |
| 8,720,311 B2 | * | 5/2014 | Sheehy et al. | 82/121 |
| 2006/0196325 A1 | * | 9/2006 | Sakai | 82/121 |
| 2009/0090226 A1 | * | 4/2009 | Sahm et al. | 82/159 |
| 2015/0040732 A1 | * | 2/2015 | Ozawa | 82/121 |
| 2015/0328692 A1 | * | 11/2015 | Beck | B23B 29/20 33/645 |

FOREIGN PATENT DOCUMENTS

| | | |
|---|---|---|
| DE | 10 2008 048206 A1 | 4/2010 |
| DE | 20 2010 004617 U1 | 7/2010 |
| DE | 10 2009 0338005 A1 | 1/2011 |
| EP | 0 780 179 A1 | 6/1997 |

* cited by examiner

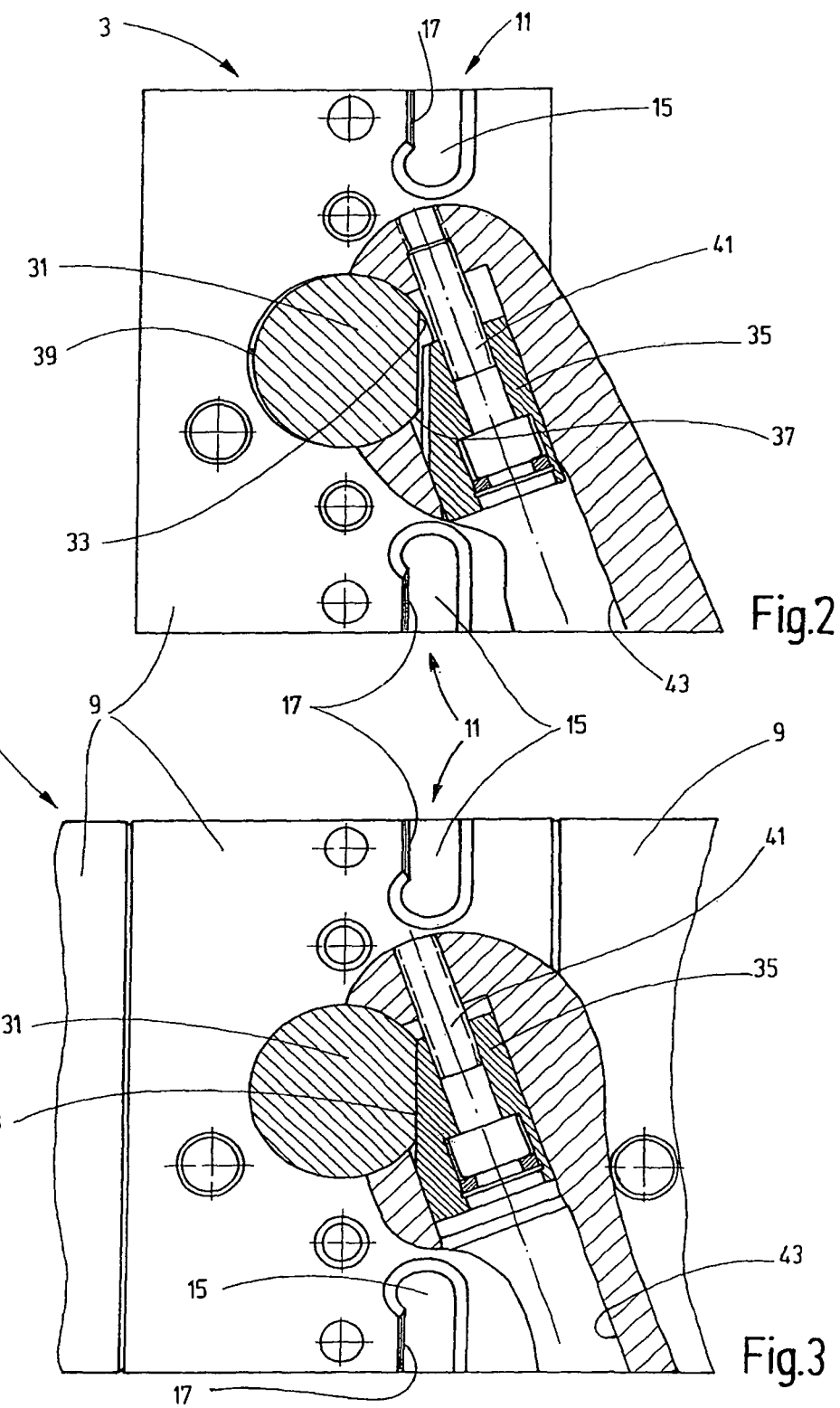

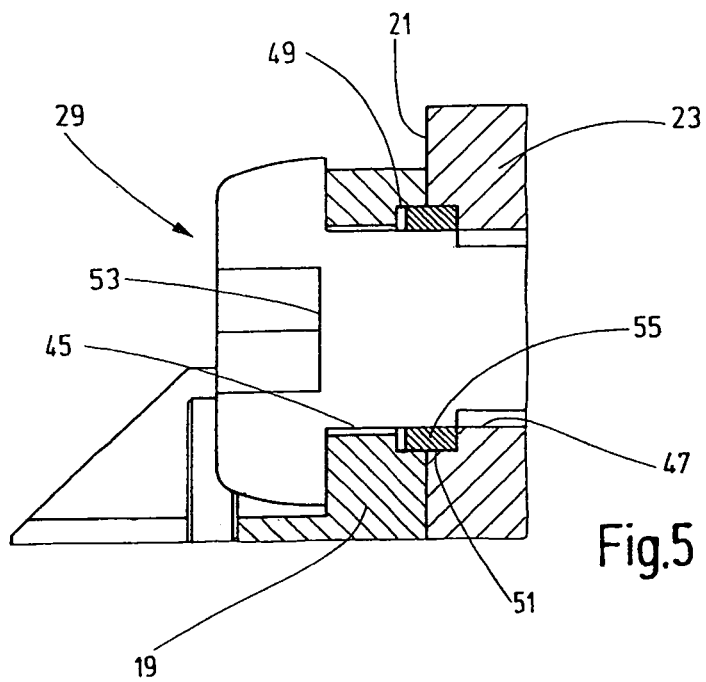
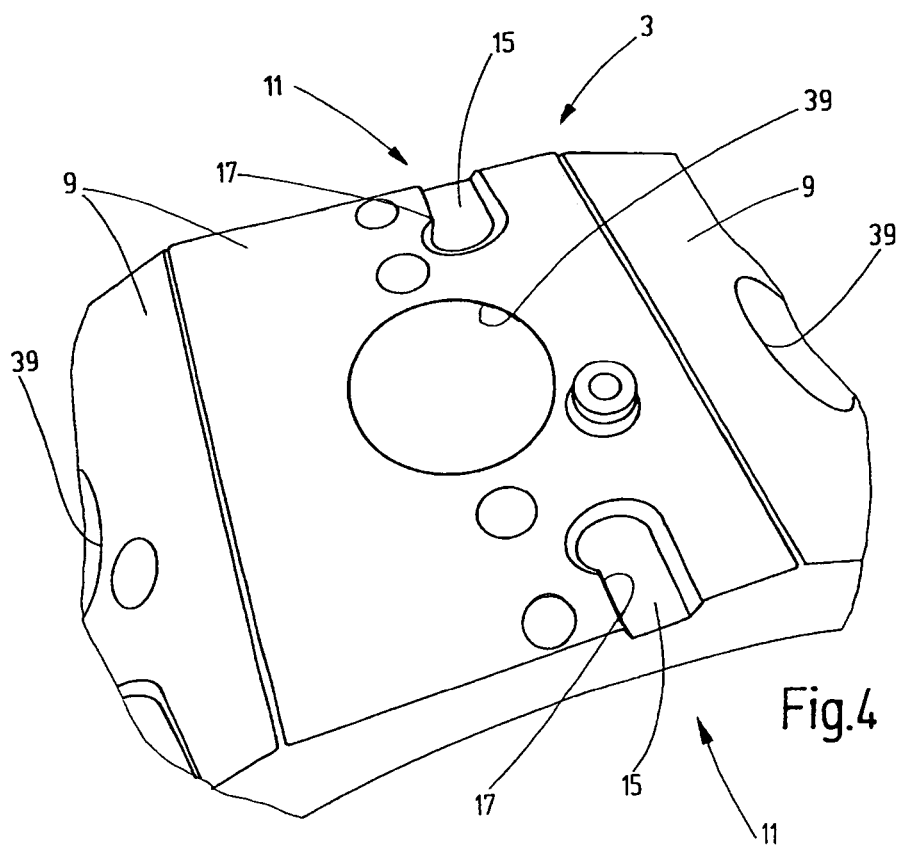

FIXING APPARATUS

FIELD OF THE INVENTION

The invention relates to a fixing apparatus for releasably fixing, at least one functional component, in particular in the form of a tool holder, on another functional component, in particular in the form of a tool disk, about at least one fixing axis. The two functional components each have a bearing surface for mutual contact with one another. Both functional components have at least one fixing element.

BACKGROUND OF THE INVENTION

Tool disks are used in industrial manufacturing in combination with tool turrets. If several tool holders with associated tools (e.g., stationary cutting chisels or driven milling tools) are placed over the circumference of the tool disk, turning this arrangement allows for quick changing of the tools that is required for certain machining operations. Since only minimal manufacturing tolerances are generally allowed for machining workpieces, using such tool turrets in a meaningful way requires that the respective tool holder and the respective tool be fixed in a repeatable and exactly defined position relative to the tool disk.

EP 0 780 179 B1 discloses a fixing apparatus of the aforementioned type. This device as a fixing element incorporates a projecting molded body on the tool holder and provides a recess as a fixing element at the respective tool station of the tool disk. The recess receives the molded body of the tool holder when the bearing surface of the tool holder contacts the bearing surface of the tool disk. The molded body and the recess free of play then engage one another to position the tool holder on the tool disk. To obtain the required predetermined position for operating the tool holder, the fixing elements are adjustable relative to the tool holder and tool disk. With the prior art device, in this regard one proceeds by aligning the fixing element with the respective tool station of the tool disk by a master tool holder, fixing it in a position thus adjusted by screws. For the corresponding adjustment of the fixing element of the tool holder, a master tool station with a pre-adjusted fixing element is provided on the tool disk. At the tool holder attached on this master tool station, the fixing element of the tool holder is then also appropriately adjusted and likewise fixed by screws. Given the need to provide master components and performing adjustments, tool holders equipped with the prior art fixing apparatus become relatively complicated and costly in operation.

SUMMARY OF THE INVENTION

An object of the invention is to provide an improved fixing apparatus characterized by being particularly easy to handle during operation and relatively inexpensive to construct.

This object is basically achieved according to the invention by a fixing apparatus having, as an important feature of the invention, two fixing bodies to form fixing elements on one of the functional components. The fixing bodies are spaced apart on both sides of the fixing axis and are in a fixed-position connection to the associated functional component. Each fixing body then forms a transverse fixing surface relative to the fixing axis, both of which from the same side may be placed against an associated positioning surface, which as fixing elements are located spaced apart on the other functional component. Due to the fixed-position connection of the fixing body forming the fixing surface with the associated functional component, no adjustments of the fixing elements are needed, thus simplifying handling. Compared with prior art fixing elements in the form of interlocking form locking elements, the invention is characterized by a simplified design, as the fixing suffices of both fixing bodies may be placed from the same side against the associated positioning surface of the other functional component, thus obviating the need for forming interlocking, free of play, form locking elements.

In an especially advantageous manner, the respective fixing surface may be formed on an integral fixing cam with the respective fixing body, with the fixing surface projecting from the bearing surface and defining a transverse fixing plane relative to the fixing axis.

Especially advantageously, the fixing elements of the other functional components, preferably the tool disk, have a recess in their bearing surface for forming the respective positioning surface for each fixing surface. The recess is bounded on one side by a wall portion forming the positioning surface. Thus, all components of the fixing apparatus are situated within the perimeter of the supporting surface, e.g., the tool disk, so that on the tool disk, no lateral, axially protruding parts of the fixing apparatus are found.

In especially advantageous embodiments, the fixing bodies are funned by a respective strip member mounted on opposite side faces of a rectangular base plate of the tool holder.

Especially advantageously, the strip members can be attached to the base plate by a threaded connection. The plate comprises form locking elements for forming a precision-fit connection without the use of an adjusting device.

The arrangement may here be implemented in a particularly advantageous manner such that each threaded connection for forming the precision-fit form locking between the screw and the associated holes in the strip member and base plate has a bushing seated snugly on the screw. The outer circumference of the bushing forms a fit with the holes of the strip member and the base plate. The threaded connection thus designed ensures fixation in an unchangeable position of the strip member as a result of the form locking formed at the external circumference of the bushing between the base plate and strip member and by precluding, any screw backlash due to the precision-fit of the bushing seated on the screw.

In a particularly advantageous manner, the strip members extend over a majority of the length of the relevant side face of the base plate, with a screw being provided at each end portion of the strip members.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIGS. 2 and 3 are partial top views of a tool station of the tool disk of FIG. 1, partially in section inside the tool disk of the splined shaft of a tool holder before and in the clamped state of the shaft, respectively;

FIG. 4 is a partial perspective view of the tool disk of FIG. 1 in the area of the bearing surface of a tool station; and FIG. 5 is an enlarged partial side view in section of the area of a threaded connection between the tool holder and a fixing body.

DETAILED DESCRIPTION OF THE INVENTION

Figure 1:
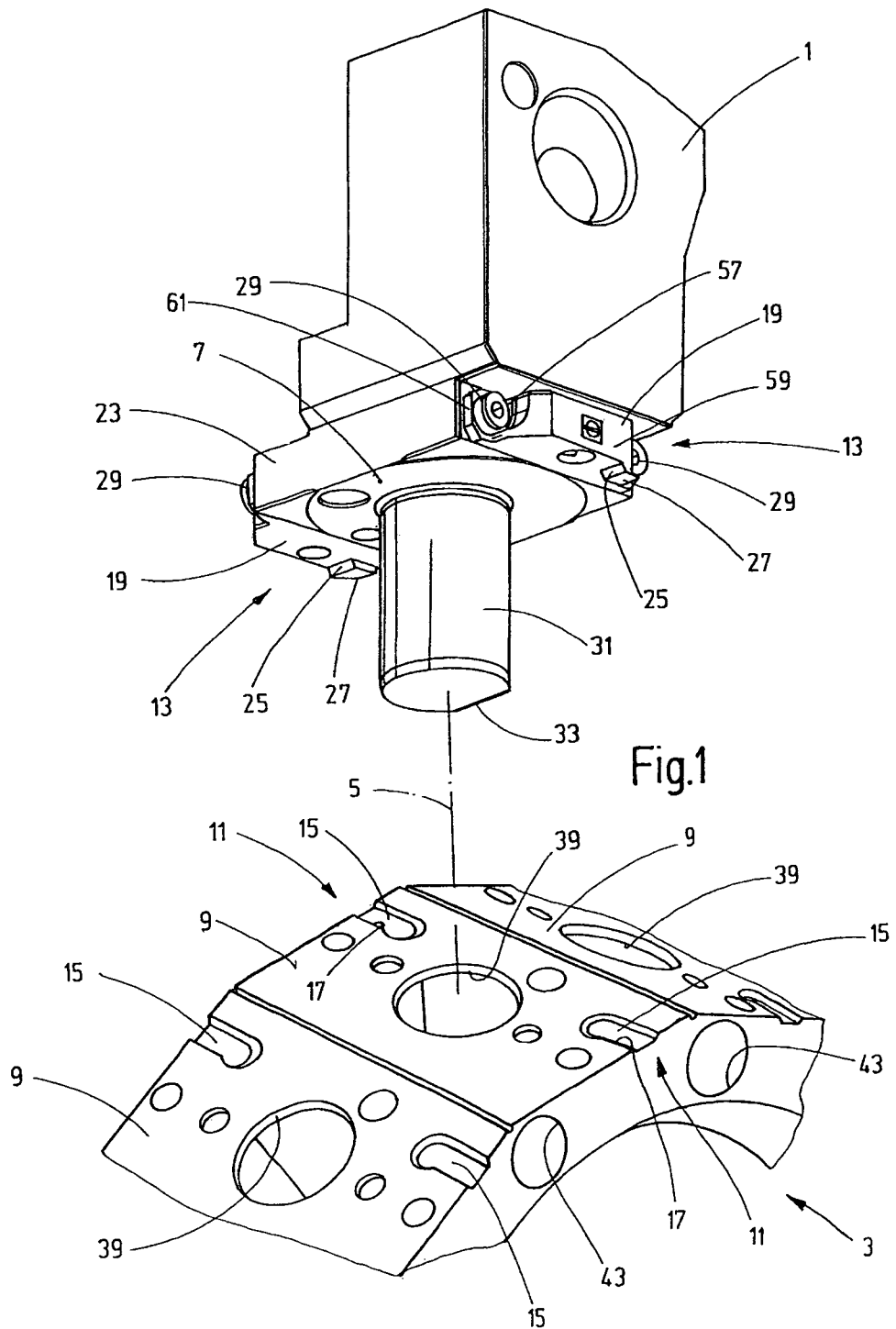
FIG. 1 is a partial, exploded perspective view of a circumferential portion of the tool disk of a tool turret showing, a tool holder in a position raised away from the receiver of the tool disk according to an exemplary embodiment of the invention.

FIG. 1 shows an exploded view of an exemplary embodiment of the fixing apparatus according, to the invention, for releasably fixing at least one functional component, presently in the form of a tool holder 1, on a further functional component, here in the form of a tool disk 3, about at least one alignment axis 5 extending in vertical alignment, as viewed in the line of sight in FIG. 1. On their adjacent facing sides, the tool holder 1 and the tool plate 3 have bearing surfaces 7 and 9, respectively, that contact one another in the fixed state of the tool holder 1.

Fixing elements 11 and 13 are present both on the bearing surface 9 of the tool disk 3 and the bearing surface 7 of the tool holder 1. The fixing elements, when brought into paired interaction with one another, ensure fixation of the tool holder 1 on the tool disk 3 in relative positioning with respect to alignment axis 5. The fixing elements 11 of the tool disk 3 have in the hearing surface 9 two recesses 15 situated on the two opposite side edges of the tool disk 3 at equal distances from an edge of the respective bearing surface 9 adjacent to the next following bearing surface 9. The recesses 15 have, as is best shown in FIGS. 2, 3, and 4, the shape of a groove bounded by parallel walls at the opening. The groove expands on the interior end in a curved manner. With the side wall situated on the left side in FIGS. 2 to 4, the recess 15 thereby forms a positioning surface 17 in a fixing plane extending transversally relative to the alignment axis 5.

The fixing, elements 13 on the tool holder 1 have two fixing bodies 19 mounted on opposite side faces 21 (FIG. 5) of the rectangular base plate 23 of the tool holder 1 forming the bearing surface 7. As explained in more detail below, the fixing bodies 19 are mounted on the tool holder 1 in unchangeable positions, i.e., non-adjustably. The fixing bodies 19 are provided on those side faces 21 of the base plate 23 corresponding with the side edges of the tool disk 3, in which the recesses 15 open out. In accordance with this positional relationship, fixing surfaces 25 provided for interaction with the positioning surfaces 17 of the tool, disk 3 are located on the fixing body 19. The fixing surfaces are located on the fixing bodies 19 each in proximity to the end of the side face 21 of the base plate 23.

The fixing surfaces 25 are formed by the straight side faces of the fixing cams 27 integrated on the fixing bodies 19 and protruding from the plane of the bearing surface 7. As can be seen in FIG. 1, the fixing bodies 19 are in the shape of strip members, with each extending on the respective side face 21 of the base plate 23 substantially along their entire lengths. At both stepped end portions of the bodies 19, a threaded connection 29 is provided for fixed-position attachment to the base plate 21 of the tool holder 1. The particulars of this threaded connection are shown in more detail in FIG. 5. Moreover, the side faces may also be spherically designed.

As shown in FIGS. 1 to 3, the tool holder 1 has a pin 31 as a holding part in the center of the bearing surface 7. Pin 31 contains an indented surface 33 on the side facing away from the observer in FIG. 1, i.e., on the side facing right in FIGS. 2 and 3. A corresponding clamping member 35 with its indentation 37 (FIG. 2) may engage indented surface 33 when inserting the pin 31 into a receiving hole 39 of the tool disk 3 located centrally in the bearing surface 9. As shown in FIGS. 2 and 3, the clamping member 35 may be clamped by a clamping screw 41 with the indentation 37 to tighten the tool holder 1 on the tool disk 3. FIG. 3 shows this clamping situation. The clamping member 35 is brought forward via a feed hole 43 formed in the side face of the tool disk 3 and accordingly screwed in place. The locking engagement achieving this clamping is common in the art and the subject of, e.g., DIN 69880. By tightening the clamping screw 41, a starting, torque is applied via the pin 31 to the tool holder 1 in the direction of the tool disk 3, so that a high contact pressure will make the two corresponding bearing surfaces 7, 9 bear against one another by involving the pairwise interacting fixing and positioning surfaces 17, 19 for positioning the tool holder 1 relative to the tool disk 3.

As mentioned above, the fixing bodies 19 with the integrally formed fixing, surface 25 thereon are in fixed-position connection with the tool holder 1. This connection is achieved, by the threaded connections 29 comprising form locking elements, shown in more detail in FIG. 5. A precision-fit connection, without screw backlash, is formed. For this purpose, both the hole 45 in the fixing body 19 and the hole 47 in the base plate 23 of the tool holder 1, at their mutually facing ends, have steps 49 and 51, respectively, widening the hole diameter. A fitting bushing 55 is arranged on the screw 53 and precision-fit seated on the fixing screw 53. Fixing screw 53 penetrates the holes 45 and 47, whereby the outer circumference of the fitting bushing is snugly seated in the expansions of the holes 45, 47 formed by the steps 49, 51.

When tightening the screw 53, a form locking connection between the fixing body 19 and the base plate 23, i.e., a non-adjustable connection between the fixing surface 25 and the tool holder 1, is created. When operating the fixing apparatus for the first time, one therefore proceeds by mounting the strip members 19, initially with unmachined fixing surfaces 25, on the tool holder 1, and centering it by the precision-fit bushings 25. After tightening the screws 53, the fixing bodies 19 are no longer adjustable. In accordance with the requirements of the high-precision definition of the position of the positioning surfaces 17 on the tool disk 3, the two fixing surfaces 25 of the fixing bodies 19 are then finished. After finishing with high precision, fixation in a predetermined position is achieved without the need of any adjustments.

A preferred embodiment of the solution according to the invention provides that the respective fixing body 19 be slotted comparable to the subsequently published DE 10 2009 033 805.5, and in accordance with the illustrations of FIGS. 4, 4a, and 4b of the subsequently published document. The pertinent longitudinal slot 57 divides the strip member 19 into two mutually connected segments 59, 61 at the bottom. The strip-shaped fixing body 19 is then implemented in a slotted manner, while forming two interconnected strip members 59, 61, whereby one strip member 59 with the fixing surface 25 connected with the cams 27 is fairly movable relative to the other strip member 61 connected to the tool holder 1 in a slot-narrowing manner, so that the gap 57, at its free upper end, narrows from the free gap cross-section or clearance.

The fixing body 19 is thus designed similar to a cuboid-shaped structural member penetrated by a groove from the upper side, forming an engagement slot 57, with the slot opening downward into a bridge as a connecting link between the two strip members 59 and 61. In this way, a bending joint is implemented on the bridge, whereby the strip member 59 can be supplied to the strip member 61 during elastic deflection around this bending point. This swiveling movement of the strip member 59 occurs only if the tool holder 1 in its corresponding installed state is located on the disk 3. In this way, the respective fixing surface 25 comes into contact with the associated positioning surface 17, possibly only partially, on the tool disk 3.

While one embodiment has been chosen to illustrate the invention, it will be understood by those skilled in the art that various changes and modifications can be made therein without departing from the scope of the invention as defined in the appended claims.

What is claimed is:

1. A fixing apparatus releasably fixing a tool holder on a tool disk about at least one fixing axis, comprising;
    first and second bearing surfaces on the tool holder and tool disk, respectively, mutually contacting one another; and
    first and second fixing elements on the tool holder and tool disk, respectively, said first fixing element including two spaced apart fixing bodies in fixed position connections with the tool holder and with one of said fixing bodies on each side of the fixing axis, each of said fixing bodies having a fixing surface extending transversely relative to the fixing axis and being placeable from a side of each of said fixing bodies facing the tool disk against an associated positioning surface on the tool disk, said second fixing element being spaced apart on said tool disk, said fixing bodies being strip members mounted on opposite side faces of a base plate of the tool holder and fixed on said opposite side faces by threaded connections, said threaded connections having form locking elements forming precision-fit connections between said fixing bodies and the base plate, each of said threaded connections including a screw and associated holes in the respective strip member and said base plate, each of said locking elements including a bushing having an outer surface matching and directly engaging outer surfaces of the respective holes in the respective strip member and said base plate about entire circumferences thereof.

2. A fixing apparatus according to claim 1 wherein said fixing surfaces are on fixing cams integrated on said fixing bodies, protrude from said first bearing surface and define a fixing plane extending transversely to the fixing axis.

3. A fixing apparatus according to claim 1 wherein said second fixing element comprises recesses in said second bearing surface forming said positioning surfaces for said fixing surfaces, each of said recesses being bounded by a wall portion forming the respective positioning surface.

4. A fixing apparatus according to claim 1 wherein said base plate is rectangular.

5. A fixing apparatus according to claim 1 wherein each said bushing has an inner surface directly engaging an outer surface of the respective screw about entire circumference thereof.

6. A fixing apparatus according to claim 1 wherein each said strip member extends over a majority of a length of a respective side face of said base plate and has end portions with the respective threaded connections.

7. A fixing apparatus according to claim 6 wherein said fixing surfaces are on fixing cams integrated on said fixing bodies, protrude from said first bearing surface and define a fixing plane extending transversely to the fixing axis; and
    each said fixing cam is located proximate one of said end portions of the respective strip member.

* * * * *